United States Patent

[11] 3,583,521

| [72] | Inventor | Nigel Allister Anstey |
| | | 12 Percival Road, Orpington, England |
| [21] | Appl. No. | 857,122 |
| [22] | Filed | Sept. 11, 1969 |
| [45] | Patented | June 8, 1971 |
| [32] | Priority | Sept. 13, 1968 |
| [33] | | Great Britain |
| [31] | | 43639/68 |

[54] CONTINUOUS SEISMIC SOURCE
16 Claims, 7 Drawing Figs.

[52] U.S. Cl............................................... 181/0.5,
340/15.5, 340/7
[51] Int. Cl............................................. G01v 1/00
[50] Field of Search............................................. 181/0.5
MW, 0.5 VM; 46/111, 112, 114, 174

[56] References Cited
UNITED STATES PATENTS

| 3,229,784 | 1/1966 | Lyons et al. | 181/0.5 |
| 3,301,345 | 1/1967 | Carder | 181/0.5 |
| 3,384,990 | 5/1968 | Romand | 46/111 |

*Primary Examiner*—Rodney D. Bennett, Jr.
*Assistant Examiner*—Stephen Buczinski
*Attorney*—Pierce, Scheffler & Parker

ABSTRACT: A continuous seismic source includes a drum towable by an axle along the ground and having radially disposed baffles arranged irregularly within its circumference, together with a plurality of steel balls or other weights. The baffles carry a sequence of the weights up the rearward side of the drum as it rolls over the ground, letting them fall irregularly. When the speed of drum motion is optimum to ensure that they fall back on the line of contact of the drum with the ground, an extended seismic signal is generated by the impact of the plurality of descending weights.

Inventor
Nigel Allister Anstey

By
Pierce, Schiffler & Parker
Attorneys

Inventor
Nigel Allister Anstey

Inventor
Nigel Allister Anstey
By
Pierce, Schiffler & Parker
Attorneys

CONTINUOUS SEISMIC SOURCE

CROSS-REFERENCE TO RELATED APPLICATION

This invention is concerned with a continuous seismic source, intended primarily for use in seismic reflection prospecting. The continuous seismic source of the present invention is particularly suitable for use in the method of making seismic records described and claimed in my copending Application for U.S. Pat., Ser. No. 857,123 Entitled "Seismic Prospecting with a Continuous Seismic Source" of even date herewith.

BACKGROUND OF THE INVENTION

FIELD OF THE INVENTION

Seismic reflection prospecting is an example of an echo-ranging method operating against a background of ambient noise. If the noise is the same for two types of source occupying the same frequency spectrum, the maximum range obtainable after optimum processing depends only on the seismic energy radiated by the two sources. In particular, the range is not affected by the waveform of the radiated signal (within the spectrum constraint, of course); it does not matter whether the energy is radiated as a short signal of great power or as a longer signal of lesser power.

The optimum processing is different in the two cases, and ordinarily the processing required for long signals is more expensive than that for single-impulse signals; however, modern developments are reducing the processing costs, while source costs tend to increase.

The traditional seismic source is a chemical explosion, yielding a single impulse of great magnitude and short duration. Another seismic source which has been much used is a falling weight; the technique is described by Neitzel in *Geophysics*, vol.23. p.58, by Domenico in *Geophysics*, vol.23. p.665, and by Shock in *Geophysics*, vol.28. p.831. The latter reference has particular concern with the common-depth-point method of operation described by Mayne in U.S. Pat. No. 2,732,906; this method is now established as standard.

The falling weight of the prior art is typically of 6,000 lb., dropped from a height of 9 ft. With a specially constructed vehicle, the weight can be dropped every 8 sec. When the weight-drop method is used with the common-depth-point technique, one basic seismic reflection observation typically involves 10 or 20 drops of the weight over perhaps 330 ft. of source extent; the reflection records from these individual drops are added to give a single record, which is then submitted for further processing elsewhere.

Although the weight-drop technique of the prior art has been very successful in some areas, it has many unwelcome features. The special-purpose vehicle is expensive, heavy and complicated; it is also subject to maintenance problems associated with the enormous stresses involved in rapid operation. Further, it is a disadvantage that it is scarcely feasible to drop two weights to strike the ground at precisely the same time, and so the single source cannot be supplemented by a second source when circumstances require it. Again, the technique cannot be used in areas where the ground is not reasonably firm, nor on paved roads.

OBJECTS OF THE INVENTION

It is an object of the present invention to provide a seismic weight-drop source which generates a continuous succession of impulses, rather than the discrete impulses of the prior art.

It is a further object to provide a seismic weight-drop source of which several may be used simultaneously.

It is a further object to provide a seismic weight-drop source whose energy output is comparable to that of prior sources, but which requires less weight.

It is a further object to provide a seismic weight-drop source particularly well adapted to operations of the common-depth-point type.

It is a further object to provide a seismic weight-drop source which is inexpensive, which can be towed behind a conventional vehicle, and which requires no power except that of the towing vehicle.

It is a further object to provide a seismic weight-drop source which can be disassembled and transported by air.

Further objects of the invention, including particularly the provision of a source which has small ground pressure and which requires little maintenance, will be apparent in the following specification.

SUMMARY OF THE INVENTION

The present invention provides a continuous seismic source, in which an extended seismic signal is generated by the impact of a plurality of descending weights. These weights are cycled continuously through a lifting stage and a descending stage. The source moves continuously, and the lifting stage is associated with the motion of the source. The source includes means to ensure that the derived seismic signal is substantially random in nature; the word "random" here signifies that study of any portion of the signal does not allow the prediction of the signal at any later time, at least within a period representing the greatest reflection time of interest.

BRIEF DESCRIPTION OF THE DRAWINGS

The invention is illustrated by the accompanying drawings, in which:

FIG. 2 shows the trajectory of a single weight in the apparatus of FIGS. 1 and 2, and the positions of the source at various times along the trajectory of the weight.

FIG. 7 shows one method of arranging the pickup transducer for the source of FIG. 4a.

DESCRIPTION OF THE PREFERRED EMBODIMENTS

Figure 1:
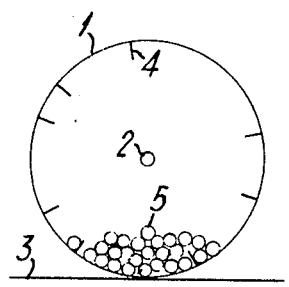
FIG. 1 shows a vertical section through one embodiment of the source, in diagrammatic form, under stationary conditions.

FIG. 1 portrays a vertical section through a large hollow drum 1, free to rotate about its horizontal axis 2 and so to roll along the surface of the ground 3. For illustrative purposes, the drum may be regarded as of 8 ft. diameter and 2½ ft. horizontal width. The cylindrical surface of the drum may be of a partially compliant material such as tough reinforced rubber or plastic sheet. At intervals around the internal circumference are disposed radial baffles (such as 4) across the width of the drum. The drum contains many weights 5; for illustrative purposes, there may be several hundred steel balls of a few inches diameter.

Figure 2:
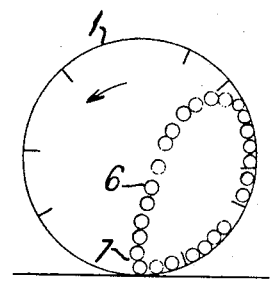
FIG. 2 shows a vertical section through the source of FIG. 1 under operating conditions, at an instant of time, with the source rolling counterclockwise.

If this drum is towed by its axle to the left, it rolls counterclockwise as shown diagrammatically in FIG. 2. The action of the baffles, combined with that of friction and the resulting centrifugal force, lifts the balls up the rearward side of the drum. At small speeds the balls do not ascend substantially beyond the plane of the axle; they then run down again over the balls ascending after them. At great speeds the centrifugal force is sufficient to maintain the balls in contact with the drum surface throughout the entire revolution, so that they never fall. At intermediate speeds, however, the balls leave the drum in the upper part of the revolution, and fall freely under gravity as shown at 6. If the energy available in the balls is to be efficiently imparted to the ground, with minimum risk of damage to the drum surface, it is desirable that the points of impact of the balls on the drum surface should be on the line on contact 7 of the drum with the ground (that is, vertically below the axle). This is the situation represented in FIG. 2.

If the radius of the drum is $a$, the speed at which the drum is towed is $v$, the acceleration of gravity is $g$, and the angle between the downwards vertical and the line joining the axle to the point at which the balls leave the drum surface is $e$, then it can be shown that the condition of impact on the ground contact is simply $$v^2 = ag.$$

and that then $$e = 120°.$$

If $T_r$ is the revolution time of the drum, and $T_b$ is the ground-to-ground cycle time of a particular weight, it can be shown also that $$T_r = \frac{2\pi a}{v}$$

and that $$T_b = \frac{3.826 a}{v}$$

If $h$ is the maximum height attained by the balls after leaving the drum surface (and therefore the height from which they fall), it can be shown also that $$h = 1\tfrac{11}{16} a.$$

If $W$ is the total weight of all the balls in the drum, this weight cycles and strikes the ground once in each $T_b$ seconds, from a height represented by $h$; if this is to be equivalent to the quoted figures for the prior devices, then $$W = \frac{T_b}{h} \frac{6000 \times 9_{lb}}{8}.$$

In the following table values are given for $v$, $T_r$, $T_b$, $h$ and $v$ for a range of values of drum radius $a$. Also given are two other quantities which are important in practice: $N$, the number of drop cycles in a linear source extent of 330 ft., and $T_s$, the time for the source to traverse 24 such source positions, or 1½ miles.

|  | $v$ | | | | | | | | |
|---|---|---|---|---|---|---|---|---|---|
| $a$, ft. | Ft./sec. | Mile/h. | Knots | $T_r$, sec. | $T_b$, sec. | $h$, ft. | $M$, lb. | $N$ | $T_s$, min. |
| 2 | 5.7 | 3.9 | 3.4 | 2.2 | 1.4 | 3.4 | 2,720 | 43 | 23 |
| 4 | 8 | 5.5 | 4.7 | 3.1 | 1.9 | 6.7 | 1,920 | 22 | 16 |
| 6 | 9.8 | 6.7 | 5.8 | 3.8 | 2.3 | 10.1 | 1,560 | 14 | 13 |
| 8 | 11.3 | 7.7 | 6.7 | 4.4 | 2.7 | 13.5 | 1,340 | 11 | 12 |
| 10 | 12.7 | 8.6 | 7.5 | 4.9 | 3.1 | 16.9 | 1,220 | 9 | 10 |

For example, the second line of the table says that, as far as source energy is concerned, the established weight-drop apparatus (dropping 6,000 lb. from 9 ft. every 8 sec.) can be replaced by a drum of radius 4 ft. towed at a speed of 5.5 mile/hr. and containing weights totaling only 1,920 lb.; at this speed the source of the present invention makes 22 drop cycles over a typical source extent of 330 ft., and completes a spread of 24 such source positions in 16 minutes.

The figures for $W$ are those which yield a source energy the same as that of conventional weight-drop apparatus in the same time. An alternative approach is to explore the value of $W$ which yields the same energy as 10 conventional drops during a traverse of 330 ft. This can be shown to be 3,700 lb.; it is independent of the drum radius. Therefore a drum radius of 4 ft. with a total ball weight of 3,700 lb. allows a 1½ mile profile to be completed in 16 minutes, with each 330-foot source section given the same energy as that obtained from 10 conventional weight-drops. The conventional weight-drop apparatus would take at least 48 minutes to do this.

Conditions requiring 20 conventional weight-drops are then met either by multiple runs along the profile or, better, by the provision of two separate sources. The latter solution, which does not slow the operation, is possible because, unlike the conventional weight-drop apparatus, the present invention allows multiple sources operating simultaneously.

Figure 3:
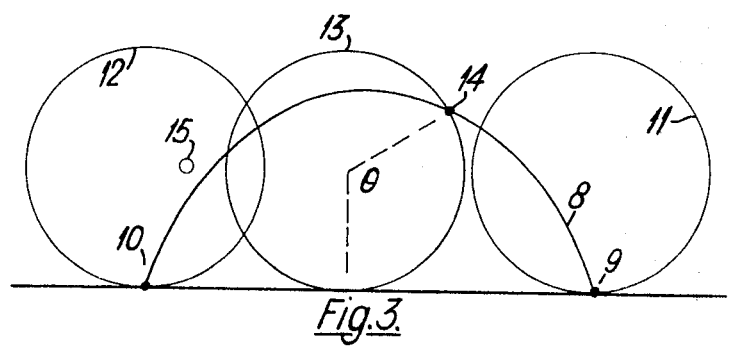

FIG. 3 shows the trajectory 8 of a single ball, from the beginning of the cycle at point 9 to the impact which ends the cycle at point 10. The position of the drum at the beginning of the cycle is shown at 11, and the position at the end of the cycle at 12. The position of the drum at the instant when the ball leaves the drum surface is shown at 13, with the parting point itself at 14. The trajectory between points 9 and 14 is a cycloid, while that between 14 and 10 is a parabola. Under the conditions laid down hereinbefore, the horizontal component of the velocity of the ball as it leaves the drum surface is 1½ times the velocity of the drum axle, but the ball does not reach the vertical through the axle until the moment of impact on the ground. The position of the axle as the ball passes through its horizontal plane is marked at 15; it can be shown that the horizontal clearance at this time is $0.24\,a$. The fact that an axle is permissible simplifies the construction.

Practical considerations of stability commend an arrangement in which two drums are used, spaced apart on a common axle like a pair of cart wheels. The desirable total weight of 3,700 lb. can then be divided between the two drums, so that each contains 1,850 lb. Thereafter, the primary factors affecting the choice of dimensions are the practical constraints on towing speed and on drum diameter. In open desert country it is feasible to consider towing a pair of drums of 16 ft. diameter at a speed of 7.7 mile/hr., thus allowing a 1½-mile profile to be completed in 12 minutes. In general, however, a drum diameter of 8 ft. is more realistic; then, according to the above table, the towing velocity must be 5.5 mile/hr., and the profile time is 16 minutes. Under very adverse conditions a drum diameter of 6 ft. might be preferable; this necessitates a towing velocity of 4.7 mile/hr., and a profile time of 19 minutes.

The choice of drum width depends on the size selected for the balls. The range of ball weights of 5 to 10 lb. (that is, diameters 3 in. to 4 in.) is well satisfied by widths of the order of 2½ to 3 ft., for a drum of diameter 8 ft.

The practical realization emerging from these considerations is shown in FIGS. 4a (side elevation) and 4b (rear elevation). The towing vehicle 16 is a standard heavy-duty tractor of a type which may be purchased locally in most areas of the world. (For a drum of diameter 8 ft. the spare power required of the tractor is about 24 hp. on level ground, or about 31 hp. on an incline of 1 in 10.) To a stout tow-point 17 is attached a tow-frame 18, which may conveniently be triangular in plan. The rear end of the tow-frame 18 supports the axle 19. Two drums 20 and 21 (FIG. 4b) revolve freely on the axle 19. In FIG. 4b the drum 20 is shown in external view, and drum 21 in vertical section. The drum is constructed around a stout central hub 22 which rotates on the axle 19. Radiating from the central hub, on each side of the drum, are spokes 23 conveniently formed of T-section members. Attached to the outer ends of the spokes 23, and forming the circumference of each side of the drum, are rim members 24; these may conveniently be of L-section material formed into the appropriate curve. All members used in the construction are adapted for easy assembly and disassembly, and made in lengths to permit easy shipment.

At irregular intervals around the circumference very stout radial baffles are attached between the two side members, as exemplified generally at 25. The spacing and radial width of these baffles are discussed later in this specification.

The cylindrical surface 26 of the drum is conveniently formed of a reinforced rubber material such as is used for conveyor belts in quarries. It is attached to the rim members 24, with external bands 27 for support and constraint. Additional support for the cylindrical surface may be provided by strips of thin steel (not shown) extending across the width of the drum; these may be external or internal to the reinforced rubber material.

The vertical sides of each drum are faced with stout wire mesh 28, to prevent the loss of balls. A hatch is provided at 29 for the introduction and removal of the balls.

It is a necessary condition for the use of this source that the succession of impacts should be substantially random, having no significant periodicities within the usual time range for seismic reflections (typically 6 sec.) Since the above table shows revolution times of less than 6 sec., the problem of ensuring randomness may appear to be difficult. However, a comparison of the values of $T_c$ (the cycle time of the drum) with the values of $T_b$ (the cycle time of the balls) shows that their ratio is not a small integer: it follows that if some randomness is imparted to the succession of impacts by the configuration of the drum, and if some is imparted by the arrangement of the balls, then the minimum period for a repetition of the succession of impacts is much longer than either cycle time. In fact, the lowest common multiple of the cycle times represents an extremely long interval, far exceeding the requirement.

The contribution of the drum to the randomness of the succession of impacts may take the form of an irregular spacing of the baffles and an irregular shape to their inside edges. The latter approach acts by affecting the time at which the ball rolls off the baffle just after leaving the surface of the drum; the horizontal component of the baffle velocity is increasing at this time, and so variations in the rolloff time introduce variations in the horizontal component of the velocity of the ball. These in turn introduce variations in the impact point of the ball; balls discharged from a baffle whose local width exceeds the ball radius impact the drum slightly in advance of the line of contact with the ground. This variation is accommodated by the compliant nature of the drum surface, which allows these impacts to be transmitted to the ground.

Variations in the impact point are also imposed by the inevitable departures from regular motion as the drum rolls over rough ground. Whatever their cause, a proportion of these variations are exaggerated by deflection from the upper edge of a baffle near the impact point; this enhances the randomness. Further contributions to randomness may take the form of one or more light deflecting members (not shown), attached to the sides of the drum or free to swivel below the hub.

The contribution of the balls to the randomness of the succession of impacts rests upon their weight, diameter and number. The diameter is relevant because of the connection with the rolloff time discussed above; it is desirable to have a scatter in the ball diameters. Similarly a scatter in the weights is permissible (under conditions to be discussed hereinafter). However, the central limit theorem (in consort with many practical considerations) commends a very large number of balls, and the inclusion of balls having a weight considerably greater than the average is therefore undesirable. A practical approach, which also results in the reasonable figures previously quoted for drum widths, is the use of a range of ball weights between 5 and 10 lb.; the necessary total weight of 1,850 lb. then involves some 250 balls. The balls may be made of materials having different densities, if desired, so that the range of diameters may differ from that otherwise imposed by the range of weights.

For an 8-foot diameter drum, the provision of 250 balls yields a mean time between impacts of about 8 m.sec.

The combination if irregularities in the drum configuration and in the balls provides for a good degree of randomness in the seismic signal imparted to the ground. As described in the aforesaid copending application, particular portions of the signal which may not have sufficiently random characteristics may be identified by computing the mean value of their normalized autocorrelation functions, and they may be automatically discarded.

Figure 4:
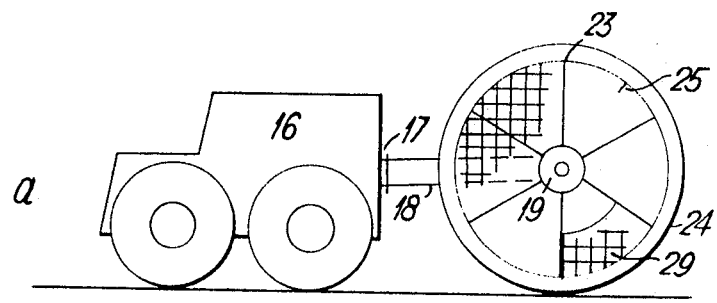
FIGS. 4a and 4b show two views of a practical realization of the source of FIGS. 1 and 2.
Figure 5:
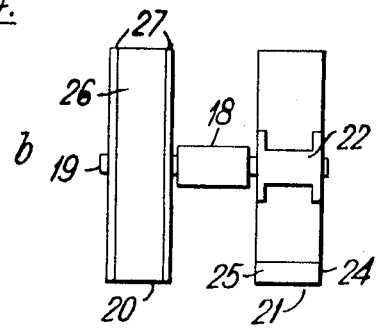
FIG. 5 shows a variation of the source, in which the anvil is provided for the transmission of the impacts.
Figure 5:
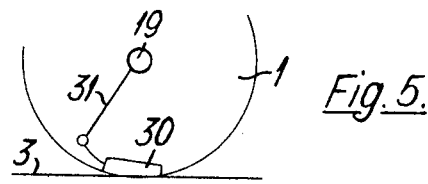

Many variations of the apparatus of FIG. 4 are encompassed within the scope of the invention. Minor variations include the complete enclosure of the sides of the drum in order to minimize the airborne sound generated by the device), the provision of studs or treads on the circumference of the drum (in order to prevent slipping on unfavorable ground surfaces), the incorporation of apparatus to wet or otherwise treat the ground in front of each drum (in order to improve the acoustic coupling of the impacts), and the provision of apparatus to sense the tow speed and thereby to regulate the engine of the towing vehicle (in order to ensure accurate conformity with the optimum velocity requirement). Other variations include the provision of rigid or flexible guides supported from the axle within the drum, and adapted to provide constraints on the path followed by the balls; in particular these may limit the region of impact to that near the line of contact with the ground, or minimize the time necessary to establish correct operation from rest. It is also possible to choose the surface materials or finish of the balls and the drum so that frictional and centrifugal forces are sufficient to raise the balls without baffles; the same end may be achieved by moulding or otherwise providing a random pattern of dimples (of size appropriate to the chosen balls) into the inner surface of the drum. In either of these cases it may become advantageous to provide an anvil for the impact of the balls, as shown diagrammatically in FIG. 5. In this FIG. a wedge-shaped anvil 30 is attached (for example, by wire rope or chain) to a member 31 fixed to axle 19 or rotatably mounted on hub 22. The inclined face of the wedge is adapted to utilize the horizontal component of the velocity of the impacting balls to assist the necessary motion of the anvil relative to the inner surface of the drum. The anvil has the merit of distributing each impact over a larger area of contact with the drum, and of protecting the outer drum surface from the worst effects of sharp stones on the ground. The material of the balls may be chosen, or the anvil may be faced with a partially compliant material, in order to minimize the generation of motional disturbances outside of the seismic frequency range.

Figure 6:
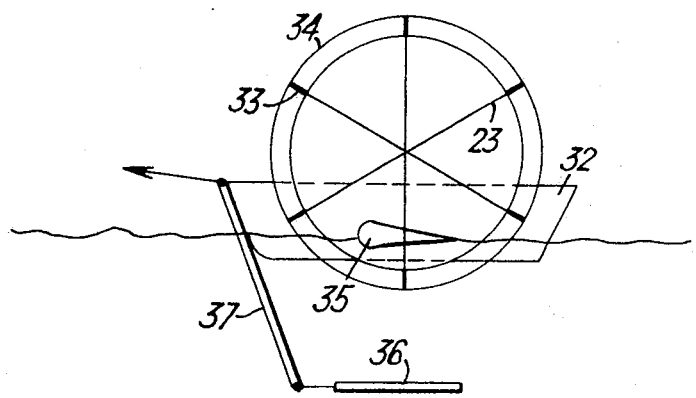
FIG. 6 shows an adaptation of the source of FIG. 4a, suited to seismic work in water-covered areas.

A most important variation is that involved in adapting the invention to seismic operations over water-covered areas. Two main modifications are desirable—to provide flotation, and to ensure rotation. Although it would be possible to make the drums themselves watertight, so that the device of FIG. 4 would float without further modification, it is preferred to provide independent buoyancy in the form of a sealed boatlike tank between the two drums. In FIG. 6 this buoyancy tank is shown at 32. Then the necessary rotation may be accomplished either by the provision of external power (as by an electric motor within the buoyancy tank, coupled to the axle and supplied with electric power from the parent ship), or by means of paddles arranged around the drum. FIG. 6 shows the general arrangement of paddles 33, supported by extensions of spokes 23 and protected by rim members 34. Clearance is maintained, of course, between the inner edge of the paddles and the drum surface.

This arrangement readily allows the use both of baffles and of an anvil. The anvil in this case is as large as possible, very light, very rigid, and strongly buoyant; it floats in the position indicated generally at 35. The shape, size and buoyancy of this member are used, in conjunction with the mean time between impacts, to ensure maximum radiation of acoustic energy within the seismic frequency range. To this end, there is merit in using a drum wider than previously considered, with a wide anvil, but with guides to constrain the balls into the central part of the drum width. In a sealed form, this arrangement can also be used totally immersed.

A device such as that shown in FIG. 6 is well-suited to seismic work in rivers and protected waters. For full-scale marine work it becomes possible to consider larger drums, more weight, and speeds in excess of 6 knots. Then, both because of the rougher conditions and the unsatisfactory acoustic nature of the ship's wake generated at these speeds, it becomes desirable to support the drums from the ship's side. Four or more drums may be arranged in this way, with lifting apparatus to bring the drums inboard when necessary.

In marine operations, of course, it is not as easy as on land to monitor the velocity criterion. However, the marine realization of the device does not require the satisfaction of this criterion as accurately as is desirable on land.

An essential feature of the utilization of a continuous seismic source is the detection of the outgoing seismic signal or a waveform derived from it. In marine applications this is straightforward: one or more pressure hydrophones are deployed under each source, typically in streamlined housings (such as 36 in FIG. 6) towed from a faired member such as 37 attached to the buoyancy tank 32. Alternatively a vertically sensitive geophone may be incorporated into the floating anvil 35, with the electrical signal therefrom led out of the apparatus by inductive coupling, by slip rings, or through a hole in the axle.

Figure 7:
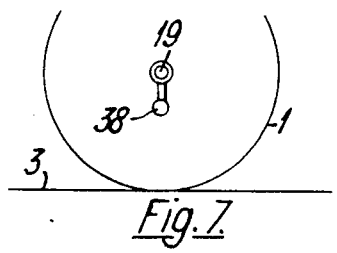

In land applications employing an anvil a similar arrangement may be used. Alternatively the anvil may incorporate a piezoelectric ceramic spark generator, adapted to produce a spark (and so radiate detectable radio waves) each time an impact occurs. In this case the tow vehicle is equipped with suitable radio apparatus for relaying the composite signal derived from both drums. Alternatively again, and as shown generally in FIG. 7, the detecting apparatus 38 may be of magnetic type, disposed near the line of flight of the balls and extending across the width of the drum, and adapted to produce an indication each time a ball disturbs its magnetic field. Alternatively again, the detecting apparatus may be one or more motion-insensitive pressure microphones supported from the axle and placed as close as possible to the impact area. Any such apparatus incorporated inside the drum must be suitably protected by stout deflecting members.

The signal derived from the detecting apparatus is ordinarily transmitted by radio to the seismic recording station. It may also be applied to a loudspeaker in the cab of the tow vehicle; the sound gives the driver a good indication of the proper operation of the source.

An alternative approach to the detection of the outgoing seismic signal involves the use of a continuous detector laid on the ground close to the line of traverse of the source. This has the disadvantage of requiring laying and recovering operations, and it risks including in its output some nonrandom contribution from the vehicle engine; however, it has merit in including the other seismic noises generated by the tow vehicle and the reaction forces of the drum on the ground.

In the cases where the detector output represents the radiated seismic signal itself, the selection of ball material, anvil material or configuration, or drum surface material will ordinarily have ensured that the radiated signal is primarily within the useful seismic spectrum, and that therefore the detector output is also within this spectrum. Additional filtering may be imposed on the detector output, if desired, before or after transmission to the recording station.

I claim:
1. Apparatus operable to provide continuous seismic source, comprising a plurality of weights, means for causing said weights to descend substantially successively from a raised position into impact—radiating contact with ground or water beneath said apparatus, means for ensuring that the weights descend in a succession which is substantially random at least within a period exceeding the greatest reflection time of interest, means for lifting said weights after impact back to the raised position and recycling them continuously through the descent and lifting cycle, and means for advancing said apparatus substantially continuously along a linear path in contact with ground or water, an extended seismic signal being generated by the impacts radiated by said descending weights.

2. Apparatus according to claim 1, in which the means effecting the lifting and descent cycle are operative only when the apparatus is being advanced along its linear path.

3. Apparatus according to claim 2, including a drum rolling in contact with ground or water, said plurality of weights being within said drum, the internal periphery of said drum being equipped with means for lifting said weights in continuous succession to a raised position as the drum is rolled forward along the linear path of said apparatus, said lifting means serving also to release each said weight as it reaches the raised position, permitting it to descend impacting itself against the drum wall adjacent the line of contact with ground, the resultant impact being radiated via the drum wall to ground or water.

4. Apparatus operable to provide a continuous seismic source, comprising a drum 1 rotatable about an axis 2 to advance said drum along a linear path in contact with ground or water, a plurality of weights 5 within said drum, a plurality of weight-engaging members 4 irregularly disposed around the internal periphery of said drum, said weight-engaging members being adapted to release each said weight when it is carried thereby on rotation of the drum into the upper segment thereof, said weights on release descending to impact themselves in a substantially random succession against said internal drum periphery closely adjacent the ground contact line of said drum, the resultant impacts being radiated via the drum to the external ground or water, thus generating a continuous, extended seismic signal as the drum is advanced.

5. Apparatus according to claim 4, in which weights of different dimensions are present in said plurality of weights.

6. Apparatus according to claim 4, in which weights of different masses are present in said plurality of weights.

7. Apparatus according to claim 4, which also includes an anvil 30 mounted within said drum in sliding contact with the inner periphery thereof adjacent its ground contact line for receiving the impacts of the plurality of descending weights and radiating them via the drum to external ground or water.

8. Apparatus according to claim 4, which includes a transducer 36 and associated electrical circuitry yielding a record related to the radiated seismic signal.

9. Apparatus according to claim 4, which includes a prime mover 16 coupled to the drum to rotate and advance it along its linear path in contact with ground or water.

10. Apparatus operable over water-covered areas to provide a continuous seismic source, comprising a drum 1 rotatable about an axis 2 supported on flotation means 32 and advanceable therewith along a linear path with the drum partly submerged in water, means 33, 23, 34 for rotating said partly submerged drum, a plurality of weights 5 within said drum, a buoyant anvil 35 floatingly supported on the water surface within said drum, a plurality of weight-engaging members 4 irregularly disposed around the internal periphery of said drum, said weight-engaging members being adapted to release each said weight when it is carried thereby on rotation of the drum into the upper segment thereof said weights on release descending to impact themselves in a substantially random succession against said buoyant anvil, the resultant impacts being radiated from the anvil to the water within and without the drum, thus generating a continuous, extended seismic signal as the drum is rotated and advanced.

11. Apparatus according to claim 10, in which weights of different dimensions are present in said plurality of weights.

12. Apparatus according to claim 10, in which weights of different masses are present in said plurality of weights.

13. Apparatus according to claim 10, which includes a transducer 36 and associated electrical circuitry yielding a record related to the radiated seismic signal.

14. Apparatus according to claim 10, including a prime mover for towing said drum through the water, and in which the means for rotating said drum include paddles 33.

15. Each and every novel feature or combination of features of the apparatus and method explicitly or implicitly disclosed in the foregoing specification and the accompanying drawings.

16. A method of generating an extended, substantially continuous seismic signal, in which apparatus according to any one of the preceding claims 1 to 4 is advanced rotatingly along a linear path at a speed whose square is substantially equal to half of the product of the drum radius and the acceleration of gravity.